United States Patent [19]

Jones

[11] 3,995,502
[45] Dec. 7, 1976

[54] SLIDE ASSEMBLIES

[75] Inventor: Clive Jones, Coventry, England

[73] Assignee: Chrysler United Kingdom Limited, London, England

[22] Filed: Sept. 30, 1974

[21] Appl. No.: 510,654

[30] Foreign Application Priority Data

Oct. 4, 1973 United Kingdom ............ 46441/73

[52] U.S. Cl. .................................. 74/18.2; 74/498; 74/422; 277/212 FB
[51] Int. Cl.² .......................................... F16J 15/50
[58] Field of Search ............... 74/422, 18.1, 17.8, 74/18.2, 498; 277/212 FB; 280/96

[56] References Cited

UNITED STATES PATENTS

| 856,082 | 6/1907 | Moore | 74/18.2 |
|---|---|---|---|
| 1,847,677 | 3/1932 | Sternbergh | 74/18.1 |
| 2,432,803 | 12/1947 | Rice | 74/18.1 |
| 3,101,131 | 8/1963 | De Carbon et al. | 74/18.2 |
| 3,157,061 | 11/1964 | Parker | 74/498 |
| 3,554,048 | 1/1971 | Adams | 74/422 |
| 3,669,575 | 6/1972 | Beckerer | 74/18.2 |

FOREIGN PATENTS OR APPLICATIONS

| 1,491,446 | 7/1967 | France | 277/212 FB |
|---|---|---|---|
| 872,318 | 3/1953 | Germany | 74/18.2 |
| 1,074,357 | 7/1967 | United Kingdom | 74/498 |

*Primary Examiner*—John J. Camby
*Assistant Examiner*—Henry C. Yuen
*Attorney, Agent, or Firm*—Edward F. Connors

[57] ABSTRACT

The disclosure relates to a rack and pinion assembly in which flexible bellows are provided at both ends of the assembly between the ends of the rack housing and the ends of the rack. The bore at each end of the housing is enlarged and the bellows at each end of the assembly is so connected to the end of the housing and the rack that as the rack is retracted into the housing by movement in one direction the bellows is retracted into the bore and is wholly accommodated in the bore when the rack is fully retracted into the housing.

7 Claims, 1 Drawing Figure

U.S. Patent      Dec. 7, 1976      3,995,502
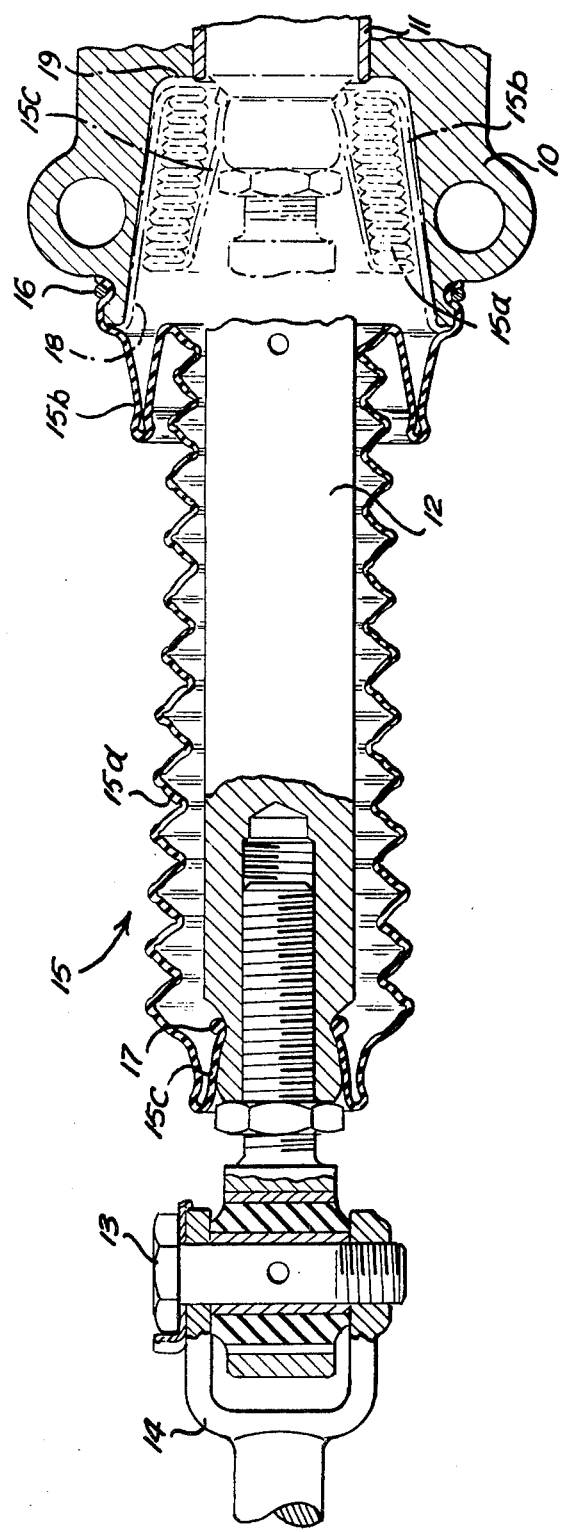

SLIDE ASSEMBLIES

BACKGROUND OF THE INVENTION

1. Field of the Invention

The invention relates to slide assemblies such as rack and pinion steering mechanisms, piston type dampers and the like.

2. Description of the Prior Art

U.S. Pat. No. 3,554,048 is exemplary of the prior art and discloses a rack and pinion steering mechanism for a motor vehicle. At each end of the assembly there is a flexible bellows extending between the end of the rack housing and a steering link connected to the rack. When the rack is retracted into one end of the assembly the bellows at that end of the assembly is contracted together adjacent the end of the rack housing. In order to accommodate the bellows at ends of the housing the length of the housing is restricted and this is undesirable in certain circumstances. For example, a longer housing may be necessary in order to span the mounting points on the vehicle sub-structure to which the rack housing is to be mounted.

SUMMARY OF THE INVENTION

The invention provides a slide assembly comprising a housing, a member slidably supported in a bore in the housing to project to a variable extent from an opening at one end of the bore in the housing and a flexible tubular bellows one end of which is secured to one end of the housing and the other end of which is secured to the member, the bore at the open end of the housing being sufficiently large to receive the flexible bellows in contracted condition when the member is retracted into the housing.

BRIEF DESCRIPTION OF THE DRAWING

The drawing shows in section a part of a rack and pinion steering mechanism for a motor vehicle.

DESCRIPTION OF THE PREFERRED EMBODIMENT

The drawing shows an end part of a rack and pinion mechanism for steering motor vehicle wheels comprising a rack housing 10 having a bore 11 in which a rack 12 is slidable. The rack is moved by a conventional pinion (not shown) mounted in the housing and meshing with the teeth of the rack. Each end of the rack is connected by a flexible universal coupling 13 to a steering rod 14 connected in turn to a steering arm (not shown) of a vehicle wheel.

A tubular flexible bellows indicated generally at 15 extends between the end of the rack housing and the end of the rack. The bellows has a main portion 15a which tapers towards the end connected to the housing and which is capable of collapsing in "concertina" fashion. The reduced diameter end of the main portion 15a is connected to the housing by an end portion 15b which increases in diameter between the main portion and housing. The larger diameter end of the main portion 15a is connected to the rack by an end portion 15c which reduces in diameter between the main portion and the rack. The end portion 15b is secured in a groove around the periphery of the housing by a clip 16 and the end portion 15c is secured in a groove in the outer periphery of the rack by a clip 17. The bellows 15 provide a seal against dirt or moisture entering the housing 10 whilst permitting movement of the rack 12 to effect steering.

The end portion of the housing 10 is formed with a tapering counter bore 18 which reduces away from the end of the housing and is connected to the bore 11 by a shoulder 19 which faces axially out of the housing.

When the rack is retracted into the housing the main portion 15a of the bellows collapses and at the same time, the end portions 15b, 15c of the bellows roll inside out as the rack is retracted into the housing. When the rack is fully retracted the main portion of the bellows is located within the counter bore and is nested in collapsed condition between the end portion 15b of the bellows and the end portion 15c of the bellows as shown in dotted outline on the drawing. Movement of the rack outwardly of the housing unrolls the end portions 15b, 15c in the opposite sense and expands the main portion of the bellows. A similar bellows is provided at the other end of the rack and pinion mechanism.

It will be understood that because the flexible bellows can be accommodated within the rack housing at both extremities of movement of the rack, a longer rack housing can be used than would be possible if the contracted bellows had to be accommodated externally of the rack housing adjacent the end thereof. A longer rack housing may be necessary, for example, to suit the particular installation requirements on the vehicle structure.

Each bellows may be provided with a small diameter hole intermediate its ends to ensure air pressure equalization between the interior and exterior of the bellows.

The invention is equally applicable to other arrangements where a flexible bellows is connected between an end of a housing and a slide member which slides in the housing. For example, the invention may be applied to telescopic suspension struts.

I claim:

1. A slide assembly comprising a housing having a bore provided with an open end, a member slidably supported in said bore in the housing so as to selectively project to a variable extent from the open end of the bore in the housing and a flexible tubular bellows having opposing ends, one end of which is secured to the housing at the open end of the bore and the other end of which is secured to the member remote from the housing, the bore at its open end at the housing being constructed to receive therein the flexible bellows in its contracted condition when the member is moved into a retracted position within the bore in the housing.

2. An assembly as claimed in claim 1 wherein the tubular bellows has a main body portion which reduces in diameter towards the housing and is joined to the housing by one end portion which increases in diameter towards the housing and is joined to the member by another end portion which reduces in diameter towards the member so that when the bellows is drawn into the housing, the main body portion of the bellows contracts and is nested beneath the end portion connected to the housing and the end portion connected to the member.

3. An assembly as claimed in claim 1 wherein said bore has a counterbore extending along the bore from said open end of the housing so as to accommodate the bellows in its contracted condition.

4. An assembly as claimed in claim 3 wherein the counterbore tapers as it extends inwardly of the housing away from said open end of the housing.

5. An assembly as claimed in claim 3 wherein the counterbore has, at its end remote from the open end of the housing, an annular shoulder extending inwardly to said bore, shoulder facing axially outwardly of the open end of the housing.

6. An assembly as claimed in claim 5 wherein the housing comprises a rack housing and the member comprises the rack.

7. A slide assembly comprising a housing having a bore provided with an end having an opening, a member slidably supported in said bore in the housing to project to a variable extent from the opening at the one end of the bore in the housing and a flexible tubular bellows having opposing ends, one end of which is secured to one end of the housing around the bore and the other end of which is secured to the member, the tubular bellows having a first tapered tubular end portion connecting said one end of the bellows to the housing around the bore, the first tubular end portion increasing in diameter between the bellows and the housing, and a second tapered tubular end portion connecting the other end of the bellows to the slide member, the second tubular end portion reducing in diameter between the bellows and the slide member, the tubular bellows having a reducing diameter towards said one end thereof so that the bellows is adapted to nest between the first and second tubular end portions and the open end of the bore in the housing being provided with a counterbore which tapers into the housing to receive the bellows nested within the first end and encircling the second tubular end portion when the slidable member is retracted into the bore in the housing.

* * * * *